United States Patent Office 3,663,602
Patented May 16, 1972

3,663,602
1,1-DIARYL-2-ADAMANTYL ETHYLENE COMPOUNDS
Martin Steinman, Bloomfield, N.J., assignor to Schering Corporation, Bloomfield, N.J.
No Drawing. Filed Aug. 25, 1969, Ser. No. 852,906
Int. Cl. C07c 69/76
U.S. Cl. 260—479 R
6 Claims

ABSTRACT OF THE DISCLOSURE 1,1-diaryl-2-adamantyl ethylene compounds particularly useful as antifertility agents.

---

This invention relates to compositions of matter classified as 1,1-diaryl-2-adamantyl ethylene compounds and to processes for making and using such compositions.

The invention sought to be patented, in its composition aspect, is described as residing in the concept of a chemical compound having a molecular structure in which two aryl moieties each having a substituent in the para-position are attached to one carbon atom of an ethylenic moiety and an adamantyl moiety is attached to the other carbon atom; and more specifically wherein the said para-substituents are hydroxy groups or esters thereof.

The invention sought to be patented, in one of its process aspects, is described as residing in the concept of inhibiting gestation by administering a therapeutically effective quantity of a composition of matter of this invention to a female mammal as the essential active ingredient of a pharmaceutical formulation.

In another of its process aspects, the invention resides in the dehydration of a benzhydrol or benzhydryl carbinol to produce compositions of matter of this invention. Still another process aspect relates to the preparation of the desired benzhydrol by the condensation of a β-adamantyl acetyl ester with a para-substituted phenyl Grignard reactant (or other equivalently functioning reactants).

The invention sought to be patented in its composition aspect can in a more limited fashion be described as residing in a concept of chemical compounds having the structural formula:

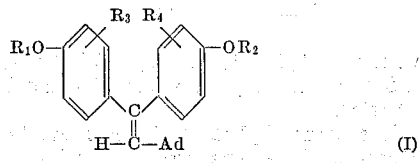

(I)

wherein $R_1$ and $R_2$ each represents a hydrogen atom, a lower alkyl or an acyl radical; $R_3$ and $R_4$ each represents a hydrogen atom, a halogen atom or a lower alkyl radical and Ad represents an adamantyl radical.

When $R_1$ or $R_2$ are lower alkyl they can be either straight or branch-chained radicals such as methyl, ethyl, propyl, iso-propyl, n-butyl, tert-butyl, n-amyl, iso-amyl, n-hexyl and the like. Methyl is the preferred lower alkyl substituent.

Acyl radicals may be derived from such normally pharmaceutically acceptable acids as monobasic lower alkyl carboxylic acids such as acetic, propionic, butyric and iso-butyric; and polybasic organic and inorganic acids such as succinic, maleic, tartaric, citric, carbonic, sulphuric and phosphoric acid. In those instances wherein the acyl moiety represents a polybasic acid, the remaining free acid groups may be converted to the corresponding salts of alkali metals, alkaline earth metals, ammonia or amines for example. The preferred $R_1$ and $R_2$ groups are lower alkanoyl, i.e. those having 1 to 6 carbon atoms, e.g. formyl, acetyl, propionyl, isobutyryl, valeryl and caproyl. Most preferably, $R_1$ and $R_2$ are acetyl.

It is noted that the compounds of this invention encompass isomers differing only in the carbon atom of the adamantyl ring through which bonding is achieved with the ethylenic carbon atom. The preferred isomers of this invention are the 1-adamantyl compounds.

The compounds of this invention may be prepared by methods known for the preparation of previously described compounds having similar structure.

One basic approach is to introduce a double bond between the benzhydryl moiety and the adamantyl methyl moiety of the molecule, starting from a compound having a saturated bond between the said two moieties. The introduction of a double bond may be accomplished by using well-known chemical methods.

In a preferred process a starting compound of the general Formula II

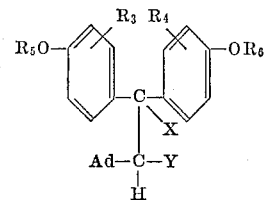

(II)

wherein Ad, $R_3$ and $R_4$ are as previously defined; $R_5$ and $R_6$ can be $R_1$ and $R_2$, respectively or a blocked hydroxy group which is solvolyzed spontaneously under the conditions of reaction applied so as to form a free hydroxy group, or a blocked hydroxy group which is subsequently liberated; and X and Y are groups which are attached to adjacent carbon atoms and are capable of being eliminated under the conditions of reaction applied; is subjected to an elimination reaction leading to removal of both groups X and Y, with concomitant formation of a double bond between those carbon atoms to which said groups were attached.

Typically, of X and Y, one is hydrogen and the other is hydroxy, hydrogen or the residue of an inorganic or organic acid, or one is hydroxy and the other is an alkoxycarbonyl group, or both X and Y may be halogen. Preferred inorganic acid residues are halogen (e.g. Cl, Br and I), OSOCl and SH. Typical organic acid residues are those derived from lower alkanoic acids, e.g. acetoxy, and the ethoxycarbonyl groups.

$R_5$ and $R_6$ may have the same meaning as given for $R_1$ and $R_2$ above; preferably, however, $OR_5$ and $OR_6$ are lower alkoxy, e.g. methoxy, or another hydroxy blocking group such as α-ethoxyethoxy and tetrahydropyranyloxy. The lower alkoxy groups are subsequently converted into the free hydroxy groups by methods such as ether cleavage employing, for example, potassium hydroxide at elevated temperature, or boron tribromide or aluminium trichloride at ambient temperature.

Other blocked hydroxy blocking groups, such as the α-ethoxyethoxy and tetrahydropyranyloxy groups, are frequently converted into the free hydroxy groups under the conditions of the above elimination reaction without the necessity of applying special conditions or a subsequent ether cleavage; if there is no such automatic cleavage, subsequent ether cleavage as set forth above for the lower alkoxy groups may be applied. The free hydroxy groups in the immediate product of the elimination reaction or resulting from the above ether cleavage may in turn be converted into esterified hydroxy groups by acylation employing in known manner conventional acylating agents.

Particularly preferred starting compounds of the above

Formula II are those in which one of X and Y is hydrogen and the other is OH. Thus the compounds of this invention may be prepared by dehydrating a benzhydrol of Formula III

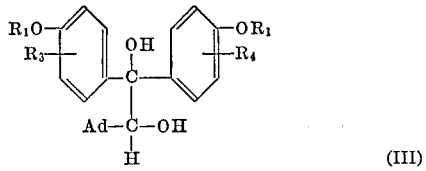

(III)

or a benzhydryl carbinol of the Formula IV:

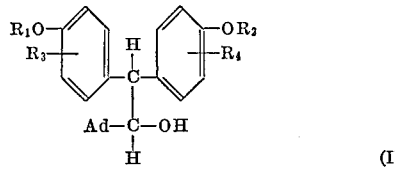

(IV)

whereby in the formulae Ad, $R_1$, $R_2$, $R_3$ and $R_4$ are as previously defined.

The benzhydrols designated by the structural Formula III are obtainable, e.g. by reacting a reactive derivative of a β-adamantyl acetic acid, especially an ester (V) or an anhydride or acid halide, with two moles of a p-substituted phenyl Grignard reagent (VI) as follows:

Reaction Scheme A:

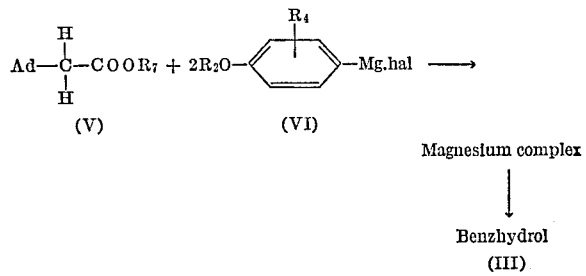

(V)        (VI)

Magnesium complex
↓
Benzhydrol
(III)

wherein Ad, $R_2$ and $R_4$ are as above defined, hal represents chlorine, bromine or iodine and $R_7$ is a lower alkyl group. The Grignard reagents (VI) are obtainable in conventional manner by reacting a compound having the general Formula VII

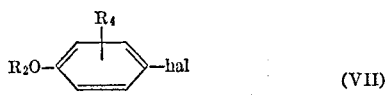

(VII)

with magnesium in a suitable form, such as magnesium turnings, in an ether, such as diethyl ether or tetrahydrofuran. If $R_2$ is a hydroxy or an acyloxy groups, the desired reactions will still proceed but will unnecessarily waste Grignard reagent through reaction therewith.

The magnesium complex formed by carrying out Reaction Scheme A in the manner conventional for Grignard reactions may be decomposed to form the desired benzhydrol by adding, for example, water or dilute acids, such as dilute hydrochloric acid or an aqueous solution of ammonium chloride.

Although the benzhydrol can be isolated and purified, such steps are not necessary to enable it to be used in preparing the benzhydrylidene compounds of this invention. It is sufficient to recover the benzhydrol from the aqueous reaction mixture by extraction with a suitable organic solvent for the benzhydrol. Suitable solvents for this purpose include higher aliphatic alcohols, ethers, ketones, hydrocarbons and halogenated hydrocarbons, e.g. diethyl ether. The extract may then be evaporated and the residue directly used as the starting material in preparing the benzhydrylidene adamantylmethylene compounds of the invention. If desired, the benzhydrol may be isolated and purified in conventional manner, for instance by recrystallation.

The benzhydrols represented by the structural Formula III are also obtainable by reacting a substituted benzophenone (VIII) with a adamantly methyl halide (IX) and two moles of a reactive metal as follows:

Reaction Scheme B:

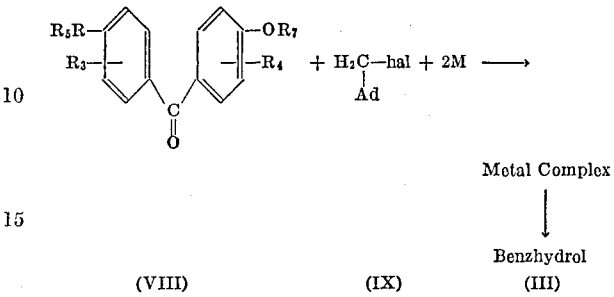

Metal Complex
↓
Benzhydrol
(VIII)        (IX)        (III)

wherein M is a reactive metal such as sodium or lithium (or butyl lithium) and Ad, $R_3$, $R_4$, $R_5$, $R_6$ and hal have the above meanings. This condensation reaction should be carried out in a solvent suitable for reactive metals, such as liquid ammonia or ether.

The resulting complex may be destroyed by conventional procedures as, for example, the addition of ammonium chloride and then water, followed by extraction with ether. The ether extract can then be poured into strong acid and the aqueous layer extracted with aqueous sodium chloride. The resulting benzhydrol can be recovered and dehydrated in the manner described above.

As a variation of the above reaction, reactant IX may be employed in the form of the respective Grignard reagent (formed in the analogous manner as compound VI) as follows:

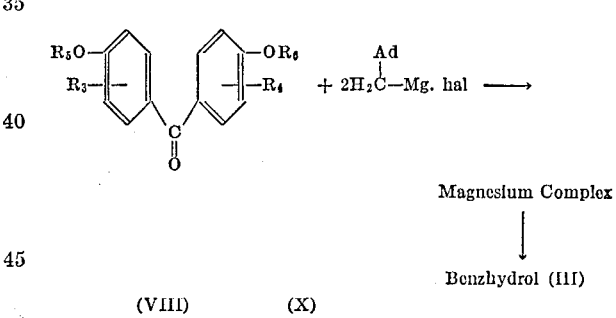

Magnesium Complex
↓
Benzhydrol (III)
(VIII)        (X)

wherein Ad, $R_3$, $R_4$, $R_5$, $R_6$ and hal have the above significance. The magnesium complex may be worked up as described above.

The benzhydryl carbinols represented by the structural Formula IV may be prepared in analogous manner to that for benzhydrol III. For example, by the method of reaction Scheme B, the desired adamantyl aldehyde is reacted with the corresponding p,p-substituted diphenylmethane in the presence of bimolar quantities of a reactive metal. These benzhydryl carbinols may be worked up and dehydrated in the same manner described above for benzhydrol III. An example is given below.

Reaction Scheme C:

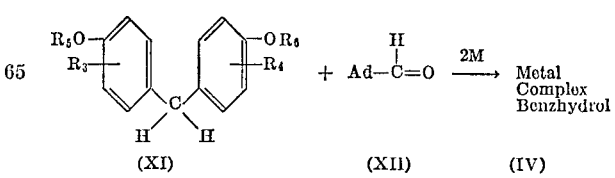

(XI)        (XII)        (IV)

(Ad, $R_3$, $R_4$, $R_5$, $R_6$ and M are as previously defined.)

In still further variants, the compounds of Formula IV can be prepared by the reaction of either (1) the imidazolide or (2) the dithioacetal derivative of an adamantane carboxaldehyde with the Grignard reagent of the desired p,p'-substituted diphenyl methyl halide as follows:

Reaction Scheme D:

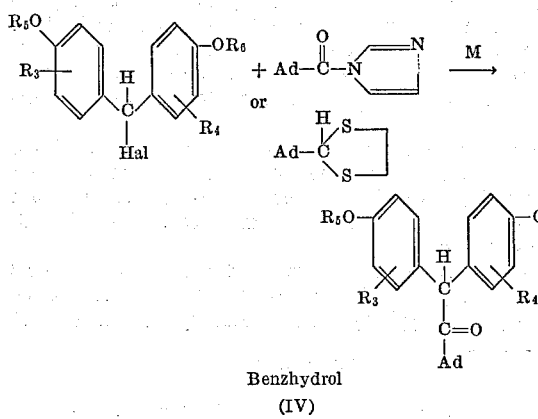

Benzhydrol
(IV)

The carbinols represented by structural Formulae III and IV may be dehydrated to the corresponding tri-substituted ethylene compounds of this invention (I) by heating under atmospheric or reduced pressure. The dehydration may be facilitated by the addition of various materials, such as sulphuric acid, phosphoric acid, phosphorus pentoxide in boiling benzene, alkali metal hydrogen sulphates, e.g. sodium and potassium hydrogen sulphate, potassium pyrosulphate, iodine in xylene and the like. The dehydration may also be carried out in aqueous to alcoholic alkali solutions, such as potassium or sodium hydroxide dissolved in water or lower alcohols having one to six carbon atoms, or with the corresponding lower potassium or sodium alkoxylates.

The desired tri-substituted ethylene compounds of the invention thus formed may be isolated in any conventional manner, such as by distillation at a pressure of 0.001 to 5 mm. of Hg and most preferably at a pressure of from about 0.01 to about 0.2 mm. of Hg. The product may then be further purified by reprecipitation or recrystallization.

The dehydration is illustrated in the following reaction scheme:

Reaction Scheme E:

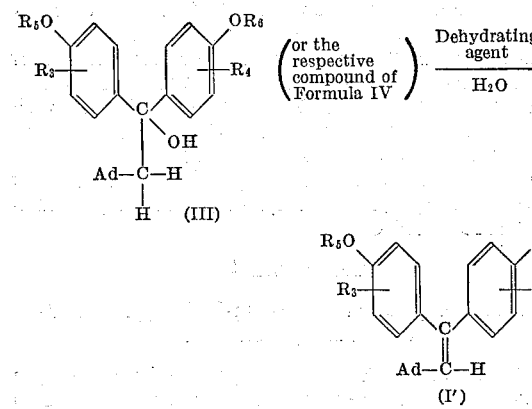

The compounds of Formula I' are, if $R_5$ and $R_6$ have the same meaning as $R_1$ and $R_2$ in Formula I, identical with the end products of Formula I of this invention. If $R_3$ and $R_6$ in Formula I' are still blocked hydroxy groups, the compound I' must be subjected to the previously mentioned further treatments in order to obtain the desired compound of Formula I.

In addition to the carbinols described above, many other compounds of the general Formula II may be subjected to the elimination reaction. The reaction schemes below (in which Ad, $R_3$, $R_4$, $R_5$ and $R_6$ are as hereinbefore defined) give some examples of such starting compounds and of reagents giving rise to the desired elimination of the respective X and Y groups:

Reaction Scheme F:

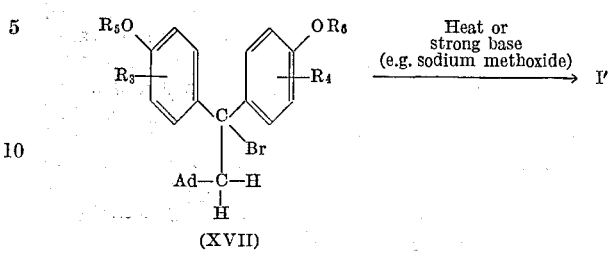

(XVII)

Reaction Scheme G:

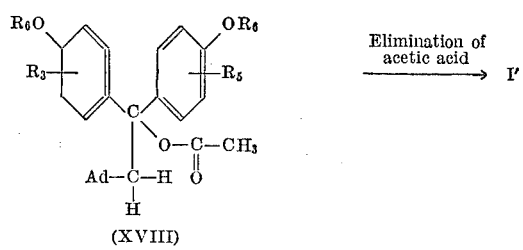

(XVIII)

Reaction Scheme H:

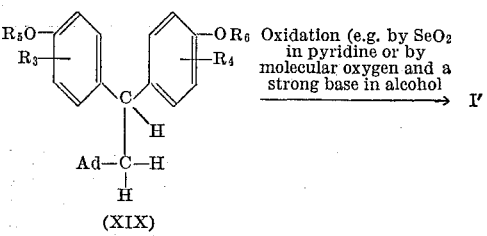

(XIX)

Reaction Scheme J:

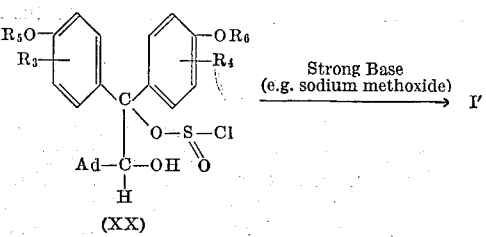

(XX)

Reaction Scheme K:

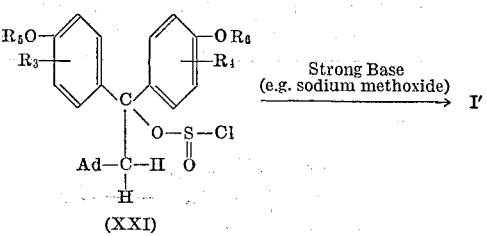

(XXI)

Reaction Scheme L:

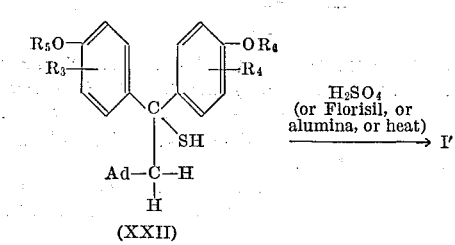

(XXII)

The elimination reagents used in the reaction schemes E, F, G, H, J, K and L may be replaced by any suitable reagents which would result in the same reaction. Thus e.g., instead of the sodium methoxide in reaction schemes F, J and K another strong base such as sodamide, potassium hydroxide in methanol, potassium t-butoxide in tertiary butanol and sodium ethoxide in ethanol could be used.

Another basic approach for preparing the compounds of this invention comprises condensing an ethylene derivative having attached to the ethylenic carbon atoms two of the three ring systems of the desired compound and a first reactive group, with a compound containing the third ring system of the desired compound and having attached thereto a second reactive group, so as to form the particular compound desired, whereby both reactive groups are eliminated. Reaction schemes M and N give examples of such condensation reactions:

Reaction Scheme M:

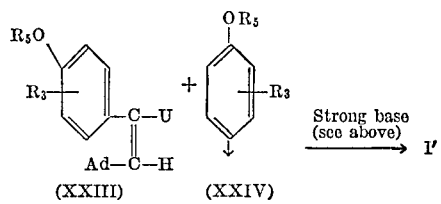

(XXIII)          (XXIV)

Reaction Scheme N:

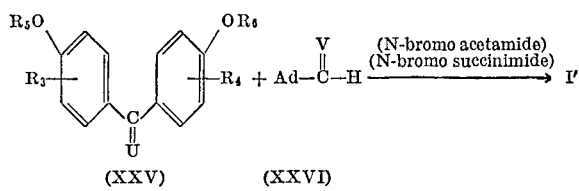

(XXV)           (XXVI)

In the above reaction schemes, Ad, $R_3$, $R_4$, $R_5$ and $R_6$ are previously defined and U and V are reactive groups capable of being eliminated under the reaction conditions applied. U and V may both be monovalent groupings (typically two halogen atoms, preferably iodo), or may both be divalent groupings typically one O and the other

Still another basic approach for preparing the compounds of this invention comprises subjecting a compound differing from a compound of Formula I' only in that at least one of the various ring systems in the molecule carries an additional substituent, to an elimination reaction resulting in removal of said additional substituent. Typical representatives for the additional substituents are groupings such as COOR, —S—, and keto. The following reaction scheme is exemplary of such elimination reactions.

Reaction Scheme O:

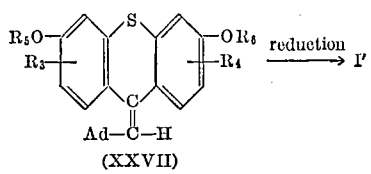

(XXVII)

In the above formula, Ad, $R_3$, $R_4$, $R_5$ and $R_6$ have the same meaning as previously mentioned. Any reducing agents known to reduce —S— to $SH_2$ may be used. Preferably this reduction is carried out by using hydrogen together with Raney nickel.

The following examples illustrate methods for the preparation of representative compounds of this invention.

EXAMPLE 1

Preparation of 1,1-di-(p-hydroxyphenyl)-2-(1-adamantyl) ethylene

Add dropwise with vigorous agitation 20.9 g. of methyl 1-adamantane acetate (0.10 mole) dissolved in 40 ml. of dry tetrahydrofuran to a Grignard reagent prepared from 7.3 g. of magnesium (0.30 mole) and 73.5 g. of p-(α-ethoxyethoxy) bromobenzene (0.30 mole) in 165 ml. of dry tetrahydrofuran. Upon completion of the addition, reflux the reaction mixture for 2 hours, cool, and pour onto 750 ml. of 10 N sulfuric acid and allow it to stand overnight.

Extract the mixture with ether, wash the ether layer with saturated sodium chloride solution and then extract the ether layer with 10% sodium hydroxide solution. Wash the aqueous alkaline solution with ether and acidify with 5 N hydrochloric acid.

The precipitate is collected and washed with water; dried and crystallized from alcohol to yield 23.2 g. of 1,1-di-(p-hydroxyphenyl)-2-(1-adamantyl) ethylene, M.P. 254–255° C.

EXAMPLE 2

Preparation of 1,1-di-(p-acetoxyphenyl)-2-(1-adamantyl) ethylene

Add 6.0 g. of 1,1-di-(p-hydroxyphenyl)-2-(1-adamantyl) ethylene (0.017 mole) to 85 ml. of acetic anhydride and add a drop of concentrated sulfuric acid. Heat the mixture on a steam bath for 30 minutes, cool to room temperature and remove most of the solvent under reduced pressure. Dissolve the residue in chloroform, pour onto 200 ml. of saturated sodium carbonate solution and stir overnight.

Separate the organic layer, wash with water, saturated sodium chloride solution and dry over magnesium sulfate. After filtering the solution, concentrate to a small volume, and add hexane to yield 6.9 g. of 1,1-di-(p-acetoxyphenyl)-2-(1-adamantyl) ethylene.

EXAMPLE 3

Alternate preparation of 1,1-di-(p-hydroxyphenyl)-2-(1-adamantyl) ethylene

Dissolve 2.5 g. of sodium metal (0.11 mole) in liquid ammonia and add 19.1 g. of p,p'-dihydroxy-benzophenone-di-2-tetrahydropyranyl ether (0.05 mole) in 75 ml. of ether. After stirring for 15 minutes add 9.2 g. of 1-chloromethyladamantane (0.05 mole) in 25 ml. of ether and stir for 4 hours. Allow to stand overnight.

Add ammonium chloride to quench the reaction and allow the ammonia to evaporate. Add 250 ml. of 10 N sulfuric acid and allow to stand several hours.

Extract the mixture with ether, wash the ether layer with saturated sodium chloride solution and then extract the ether layer with 10% sodium hydroxide solution. Wash the aqueous alkaline solution with ether and acidify with 5 N hydrochloric acid. The precipitate is collected and washed with water, dried and crystallized from alcohol to yield 1,1-di-(p-hydroxyphenyl)-2-(1-adamantyl) ethylene, M.P. 254–255° C.

EXAMPLE 4

Alternate preparation of 1,1-di(p-hydroxyphenyl)-2-(1-adamantyl) ethylene

Add dropwise with vigorous agitation 23.0 g. of the imidazolide of 1-adamantane carboxylic acid (0.1 mole) [prepared as indicated by H. A. Staab Angew. Chem., Internat. Ed., 1, 351 (1962)] dissolved in 40 ml. of dry tetrahydrofuran to a Grignard reagent prepared from 2.7 g. of magnesium (0.11 mole) and 33.8 g. of di(p-methoxyphenyl) methyl bromide (0.11 mole) in 125 ml. of dry tetrahydrofuran. Upon completion of the addition, reflux the reaction mixture for 4 hours, cool, and pour onto 400 ml. of 2 N hydrochloric acid. Remove most of the tetrahydrofuran in vacuo. Extract with ether and wash the ether layer with 0.2 N sodium carbonate solution and then with water. Dry the ether layer and evaporate to yield di(p-methoxyphenyl) methyl-1-adamantyl ketone.

Dissolve 3.9 g. of the di(p-methoxyphenyl) methyl-1-adamantyl ketone (0.01 mole) in 50 ml. of ethanol and add 0.4 g. of sodium borohydride (0.01 mole) and reflux for 2 hours. After cooling, add acetone to decompose the excess sodium borohydride and then evaporate to dryness. Add 50 ml. of 10 N sulfuric acid and stir overnight.

Extract the mixture with ether, wash the ether layer with saturated aqueous sodium chloride to neutrality, dry and evaporate to yield 1,1-di (p-methoxyphenyl)-2-(1-adamantyl) ethylene.

Stir 6.0 g. of the 1,1-di(p-methoxyphenyl)-2-(1-adamantyl) ethylene (0.016 mole) with 6.0 g. of potassium hydroxide pellets and 30 ml. of triethylene glycol at 210° C. for four hours. Cool the mixture, pour onto water, and extract with ether. Acidify the aqueous layer with 5 N hydrochloric acid.

The precipitate is collected and washed with water, it is dried and crystallized from alcohol to yield 1,1-di-(p-hydroxyphenyl)-2-(1-adamantyl) ethylene, M.P. 254–255° C.

EXAMPLE 5

Preparation of 1,1-di(p-hydroxyphenyl)-2-(2-adamantyl) ethylene

Add 62.5 ml. of a 0.2 N solution of lithium aluminum hydride in ether (3.13 mmole) to 2.3 g. of the imidazolide of 2-adamantane carboxylic acid (10 mmole) [prepared as indicated by H. A. Staab Angew. Chem., Internat. Ed., 1, 351 (1962)] in 25 ml. of ether with stirring. After one hour quench the reaction with wet ether, wash the ether layer with .1 N hydrochloric acid, dry, and evaporate the ether layer to dryness.

Dissolve the adamantane-2-carboxaldehyde and 2 g. of ethanedithiol in 40 ml. of dry ether and pass in dry hydrogen chloride slowly for an hour. After two hours evaporate to dryness.

Prepare a 0.5 molar solution of the dithioacetal; cool to −30° C. under nitrogen and treat with one equivalent of 1.5 molar n-butyl lithium in hexane. The content of anion can be checked by treatment with deuterium oxide followed by NMR analysis. It can be stored at −20° C. under nitrogen.

To a solution containing 20 millimoles of anion at −5° C. add 6.75 g. of di(p-methoxyphenyl) methyl bromide (22 millimoles) in dry tetrahydrofuran and the mixture is maintained at 0° C. overnight under nitrogen.

Pour onto water, acidify to pH 5 and extract with ether. Wash the ether layer with 3% aqueous sodium bisulfite, 5% aqueous potassium hydroxide and water, dry over sodium sulfate and evaporate to yield di(p-methoxyphenyl) methyl-1-adamantyl ketone. This is converted to 1,1-di-(p - methoxyphenyl)-2-(2-adamantyl) ethylene and then 1,1-di-(p - hydroxyphenyl)-2-(2-adamantyl) ethylene in the same manner as described in Example 4.

One can prepare the other compounds of this invention by substituting the appropriate reactants in the above procedures. For example, to produce 1,1-di(3-methyl-4-hydroxyphenyl)-2-(2-adamantyl)-ethylene or 1,1-di(3-chloro-4-hydroxyphenyl-2-(2-adamantyl) ethylene, one can substitute di(3-chloro-4-methoxyphenyl) methyl bromide and di(3-methyl-4-methoxyphenyl) methyl bromide, respectively, for di(p-methoxyphenyl) methyl bromide in Example 5. Other such substitutions of corresponding reactants will be obvious to those skilled in the art.

The tri-substituted ethylene derivatives of this invention are valuable as anti-progestational agents. As used herein "anti-progestational" is not meant to refer to the state of the reproductive process during which the compounds exert their action. Rather the term "anti-progestational" as used herein refers to the gross result, i.e. that fetal growth is inhibited. Although applicant does not wish his inventive concepts to be limited to his theory of the biological mechanism or actions effected by the compounds of his invention, it appears that they inhibit ovulation, suppress the production of progesterone and/or prevent implantation or nidation. The compounds of this invention also exhibit both strong anti-estrogenic activity and weak estrogenic activity.

The compounds of this invention are used by administering them in the form of a therapeutically effective quantity to the female mammal at a time between from several days prior to the expected onset of the sexual cycle, i.e. menses or estrus, until about one-tenth of the gestation period of the subject mammalian species has elapsed. After that time, the compounds of this invention are ineffective or are so rendered by the chemical changes in the female body and/or fetus which have occurred in the interim.

The therapeutically effective quantity of the compounds of this invention may readily be ascertained by standard and well-known techniques in the art. One such laboratory technique is the 12-day Mating Test as described in The Journal of Endocrinology (1965), vol. 33, page 242. Based on such test procedures and standard laboratory techniques as well as by comparison with known "anti-progestational" agents, the therapeutically effective dosage range for inhibiting gestation in mammals is readily determined. On the foregoing basis, a therapeutically effective dosage range for the compounds of this invention is considered to be 0.1–50 mg./kg. of body weight. Dosages in the lower part of this range, i.e. 0.1 to 25 mg./kg., are generally sufficient to inhibit gestation when taken before implantation has occurred. Dosages in the upper part of this range, i.e. 0.5 to 50 mg./kg., are generally necessary to inhibit gestation after implantation has occurred.

A suitable regimen consists of administering a single dose of 0.1–25 mg./kg. of a compound of this invention either (a) each of the five days preceding the expected onset of the sexual cycle, i.e. menses or estrus, or (b) each day for 5 to 7 days commencing 10 days after said onset. If pregnancy is suspected, a daily dose of 0.5–50 mg./kg. should be administered once daily until pregnancy is no longer suspected or until one-tenth of the gestation period is considered to have elapsed since the suspected day of pregnancy. In each specific instance, however, the attending diagnostician will, of course, determine the dosage amount and frequency taking into account related health factors of the subject female.

The compounds of this invention may be administered as such or together with suitable carriers which are pharmaceutically acceptable. A carrier is selected according to the route of administration to be used as well as according to the physical properties of the compounds and standard pharmaceutical practice. In a preferred embodiment the compositions of this invention are administered orally, although parenteral administration is also therapeutically effective and within the scope of this invention.

Typical formulations incorporating the antiprogestational agents of Formula I are described below. The formulations are intended to be merely illustrative and no limitation is implied or intended.

EXAMPLE 6

250 mg. tablets

Mix 250 mg. of 1,1-di-(p-hydroxyphenyl)-2-(1-adamantyl)-ethylene, 50 mg. of powdered sugar, and 90 mg. of corn starch and granulate with a 10% gelatin solution. Dry the granulation and reduce to uniform granules for tableting. Add 45 mg. of corn starch (as disintegrant) and about 1% of magnesium stearate (as lubricant). Compress the tablet to a weight of 450 mg. per tablet on a single punch or rotary machine, using 7/16" punch.

EXAMPLE 7

Injectable suspension 200 mg. per ml.

Sterilize the following ingredients separately: 200 mg. 1,1-di-(p-acetoxyphenyl)-2-(1 - adamantyl)-ethylene. 0.1 mg. of Tween 80 and q.s. of corn oil to make a final volume of one ml. Mix these ingredients aseptically. Attain particle size by use of micronized material or by use of a ball mill, maintaining aseptic conditions. This suspension may be administered subcutaneously and intramuscularly.

I claim:

1. A 1,1-diaryl-2-adamantyl ethylene compound corresponding to the formula

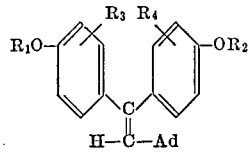

wherein $R_1$ and $R_2$ are the same and represent hydrogen, lower alkyl or lower alkanoyl; $R_3$ and $R_4$ are the same and represent hydrogen, halogen or lower alkyl and Ad represents adamantyl; said 1,1-diaryl groups being the same.

2. A compound of claim 1 wherein Ad represents 1-adamantyl.

3. A compound of claim 1 wherein $R_1$ and $R_2$ are each hydrogen.

4. A compound of claim 1 wherein $R_1$ and $R_2$ are each lower alkanoyl.

5. A compound of claim 1, said compound being 1,1-di-(p-hydroxyphenyl)-2-(1-adamantyl)-ethylene.

6. A compound of claim 1, said compound being 1,1-di-(p-acetoxyphenyl)-2-(1-adamantyl)-ethylene.

References Cited

UNITED STATES PATENTS

| | | | |
|---|---|---|---|
| 2,571,954 | 10/1951 | Shelton et al. | 260—619 A |
| 3,237,200 | 2/1966 | Barany et al. | 260—619 A |
| 3,240,669 | 3/1966 | Preau | 260—611 F |
| 3,342,880 | 9/1967 | Reinhardt | 260—613 |
| 3,287,397 | 11/1966 | Olsson et al. | 260—619 A |
| 3,406,209 | 10/1968 | Barany et al. | 260—619 A |

BERNARD HELFIN, Primary Examiner

U.S. Cl. X.R.

260—619 A, 613 R, 463, 457, 999, 502.4 R; 424—341, 346, 311